US007963507B2

(12) United States Patent
Scully

(10) Patent No.: US 7,963,507 B2
(45) Date of Patent: Jun. 21, 2011

(54) SMOKE GENERATOR

(75) Inventor: Nick Scully, Louth (GB)

(73) Assignee: Martin Manufacturing (UK) PLC, Louth, Lincolnshire (GB)

( * ) Notice: Subject to any disclaimer, the term of this patent is extended or adjusted under 35 U.S.C. 154(b) by 881 days.

(21) Appl. No.: 11/571,601

(22) PCT Filed: Jun. 23, 2005

(86) PCT No.: PCT/IB2005/001789
§ 371 (c)(1),
(2), (4) Date: Nov. 21, 2007

(87) PCT Pub. No.: WO2006/006004
PCT Pub. Date: Jan. 19, 2006

(65) Prior Publication Data
US 2008/0184888 A1 Aug. 7, 2008

(30) Foreign Application Priority Data
Jun. 30, 2004 (DK) ........................... PA 2004 01028

(51) Int. Cl.
*B05B 7/00* (2006.01)
*B01D 47/00* (2006.01)

(52) U.S. Cl. ........................ 261/28; 261/116; 261/119.1

(58) Field of Classification Search ................ 261/5, 24, 261/28, 72.1, 78.1, 115, 116, 119.1; 95/216; 96/240
See application file for complete search history.

(56) References Cited

U.S. PATENT DOCUMENTS 3,249,955 A 5/1966 Bourassa et al.
3,469,785 A 9/1969 Boucher et al.
(Continued)

FOREIGN PATENT DOCUMENTS

EP 0498113 A1 8/1992
(Continued)

*Primary Examiner* — Frank M Lawrence
(74) *Attorney, Agent, or Firm* — Roberts Mlotkowski Safran & Cole, P.C.; David S. Safran

(57) ABSTRACT

The present invention relates to a method and an apparatus for forming fog by using at least one air stream connected to a tank where the air stream forms homogeneous droplets of a fluid, which droplets flow further in the air stream towards and through at least one outlet for forming a fog. The scope of the invention is to achieve a highly effective method and apparatus for generating fog with a long stand time having a small energy consumption. This can be achieved by a method and an apparatus as described in the beginning if the method further includes a first high pressure air stream that is lead to flow in a partly parallel direction to a liquid surface for forming at least one liquid sheet, which sheet brakes into droplets where a second air stream having a lower pressure transports the droplets through at least one outlet. Hereby, it is achieved that the liquid sheet moves forward continuously as it breaks up at the edges all the way around. When this liquid film breaks up, the droplets are formed with a size depending on the thickness of the liquid sheet so that most of the droplets have a very homogeneous size. The second air stream then blows out these droplets through an outlet, and a fog is formed in the surroundings of the apparatus. Because most of the droplets have a homogenous size, they can remain in the air a very long time without letting the fog break down. In this way, a very effective fog generator is achieved.

12 Claims, 2 Drawing Sheets

U.S. PATENT DOCUMENTS

| | | | | | |
|---|---|---|---|---|---|
| 3,615,074 | A | * | 10/1971 | Cook | 261/138 |
| 3,901,443 | A | * | 8/1975 | Mitsui et al. | 239/102.2 |
| 4,836,452 | A | | 6/1989 | Fox | |
| 5,411,208 | A | * | 5/1995 | Burgener | 239/8 |

FOREIGN PATENT DOCUMENTS

| | | | |
|---|---|---|---|
| EP | 1058038 | A2 | 12/2000 |
| GB | 557899 | | 12/1943 |
| GB | 2306887 | A | 5/1997 |

* cited by examiner

SMOKE GENERATOR

BACKGROUND OF THE INVENTION

1. Field of the Invention

The present invention relates to a method for forming fog by using at least one air stream connected to a tank where the air stream forms homogeneous droplets of a fluid, which droplets flow further in the air stream towards and through at least one outlet for forming a fog.

2. Description of Related Art

The invention further relates to an apparatus for the generation of fog including a tank containing a liquid, in which tank at least one orifice for generation of droplets is contained, which orifice in operation is connected to means for generating a first air stream.

U.S. Pat. No. 4,836,452 describes an artificial fog generator where compressed air is fed into the pipes that are located directly above the liquid level, and high pressure jets are sprayed perpendicularly towards the liquid surface, and bubbles are created, which bubbles fly out of the liquid. The generated bubbles pass through filtering screens where over size bubbles are returned to the liquid, and bubbles of normal size are directed towards an outlet.

The fog that is generated contains small oil bubbles which oil bubbles are stable for a period, but over time, the bubbles might collapse, and droplets are formed. These droplets might have a size so gravity pulls the droplets downwards. The liquid used is oil, and only liquids with a sufficient high surface tension can be used for forming bubbles.

GB 2306887 describes a diffusion hazer containing a haze solution and a mixing jet that drives the solution onto an impingement surface shattering the particles of the solution. The driven air then carries the particles out through the outlet and, thereby, creating a haze-like atmosphere.

The apparatus in GB 2306887 uses air under high pressure to generate droplets. High pressure often leads to an increase in temperature, and means for cooling the high-pressure air are necessary. Generating the high pressure air and afterwards cooling the high pressure air are both power consuming processes. The use of high-pressure air leads to a formation of droplets of different sizes where only the smaller droplets can be used. To avoid big droplets, filter means are used, and the bigger droplets are returned to the liquid. The formation of droplets just to return most of them also leads to much higher power consumption than necessary. The filter means only reduces the content of bigger droplets, and the fog that is generated collapses rather quickly as the bigger droplets fall due to gravity, and where the bigger droplets during the movement downwards hit smaller droplets and are combined with them so the content of droplets in the fog is reduced rather rapidly.

The apparatus known from prior art can only operate in a correct way by using a defined chemical mixture for forming droplet in a correct way. Change of chemical mixture is only possible if the physical behaviour of the mixture is mostly equal. Especially the surface tension of the liquids must be equal.

SUMMARY OF THE INVENTION

The scope of the invention is to achieve a highly effective method and apparatus for generating fog with a long stand time having small energy consumption. Another object of the invention is to achieve an apparatus and a method where different liquids can be used for forming a fog.

This can be achieved by a method as described in the beginning if the method further includes a first high pressure air stream that is led to flow in a partly parallel direction over a liquid surface for forming at least one liquid sheet, which sheet brakes into droplets, where a second air stream having a lower pressure transports the droplets through at least one outlet.

Hereby, it is achieved that the liquid sheet moves forward continuously as it breaks up at the edges all the way around. When this liquid film breaks up, the droplets are formed with a size depending on the thickness of the liquid sheet such that most of the droplets have a very homogeneous size. The second air stream then blows out these droplets through an outlet, and a fog is formed in the surroundings of the apparatus. Because most of the droplets have a homogenous size, they can remain in the air a very long time without letting the fog break down. In this way, a very effective fog generator is achieved.

The scope of the invention can also be fulfilled with an apparatus including at least one tube, which tube is connected to a source of compressed air having a first pressure, which tube is placed in the tank, and which tube further includes an orifice placed close to the liquid surface for forming at least one liquid sheet for the generation of droplets, which apparatus is connected to a second air stream for the transportation of droplets through at least one outlet.

Hereby, it is also achieved that the homogeneous droplets can be formed and transported through an outlet and, thereby, forms a fog. Furthermore, the demand for high-pressure air is very limited because high pressure air is only used for forming the liquid film, and low pressure air is used for transporting the droplets out of the apparatus. The pressure of the high pressure is low enough to avoid the need to cool the air stream.

The orifice can form an air jet, which jet can generate a partially reduced air pressure over the liquid surface for forming the liquid sheet with a radial flow pattern under the liquid sheet. By using an air jet forming an air stream with high velocity parallel to the surface of the liquid, the effective pressure at the liquid surface under the air jet is so much reduced that the surface is lifted out of the liquid, and the liquid sheet is formed. The liquid sheet appears continuous and the droplets form when the radially diverging sheet becomes too thin to be maintained by surface tension.

The orifice can form a jet over the liquid surface, where the height of the jet over the liquid surface can determine the thickness of the liquid sheet. By influencing the thickness of the liquid sheet, the size of the droplets is also influenced. This means that by the construction of the apparatus, you can adjust the exact size of droplets you want in the fog. It should even be possible by adjustment means to make adjustments in a way where the size of the droplets could be adjusted during operation of the apparatus.

As an alternate solution, the air velocity can determine the thickness of the sheet. This way, it can also be achieved that the size of the droplets can be adjusted in a very simple way as the change of the pressure of the compressed air seems to be a very easy way to adjust the function of the apparatus.

The jet diameter can have influences of the drop formation. Hereby is achieved that an adjustment of the jet is possible by changing technical parameters of the orifice that generates the jet. The orifice cold be exchanged or the orifice could comprise means for adjustment during operation.

The tube can be closed at a defined distance from the orifice in order to form an acoustic oscillation in the compressed air contained in the tube for droplet formation of the liquid sheet. Hereby, it is achieved that there is a continued standing oscillation in the bottom of the tube. This oscillation has influence on the liquid sheet, which might be partly oscillating with the same frequency as the oscillation inside the tube, and oscillation of the liquid sheet would probably increase the efficiency of the droplet formation. The defined distance from the orifice to the bottom of the tube could influence the frequency of the oscillation. This distance could, in practice, be adjustable so that by changing the effective length of the tube, the oscillating frequency is adjusted to reach the most effective output. An adjustment could be necessary if the liquid in the tank is changed so that the chemical or physical behaviour is different than the oscillation frequency, and it could adjust the formation of droplets in such a way that could be more effective. The effective length of the tube might be adjusted if the tube comprises a piston, which piston could be slideable in the tube. The piston could be connected to an actuator for reaching an automatic adjustment.

The apparatus can include at least one separator for the removal of droplets with a diameter above 10 μm. Hereby, it is achieved that even if more than 90% of the droplets have the right size, the apparatus would always produce droplets that are much bigger than expected. When forming a fog that is long-standing, it is very important to remove bigger droplets from the fog before it leaves the apparatus. The bigger droplets will just fall out of the fog forming a kind of rain beneath which is rather unpleasant for artists or performers but also for technical apparatuses standing under the fog.

The level of liquid in at least one tank can be controlled by means for a constant supply of liquid, which means comprises a drain between at least one tank towards an overflow and recovery channel from where the liquid is drained towards a pump and a concentration control system from where the liquid is supplied to the tanks. Hereby, it is achieved that the apparatus will operate in a normal way even with a small degree of movement from the horizontal plane. Also the concentration of the chemical in the tank is controlled.

The apparatus can comprise at least two tanks arranged on either side of a central air duct connected to a central fan where the outlets from the tanks are connected to the central air duct. Hereby, it is achieved that a backward curved centrifugal impeller could form the central fan.

The central air duct might be connected to a servo-controlled airflow director for adjusting the angle of the air stream in the vertical plane. Hereby, it is achieved that the angle of the generated fog is changeable during operation.

In the following, the invention will be described with reference to the drawing where

DETAILED DESCRIPTION OF THE INVENTION

Figure 1:
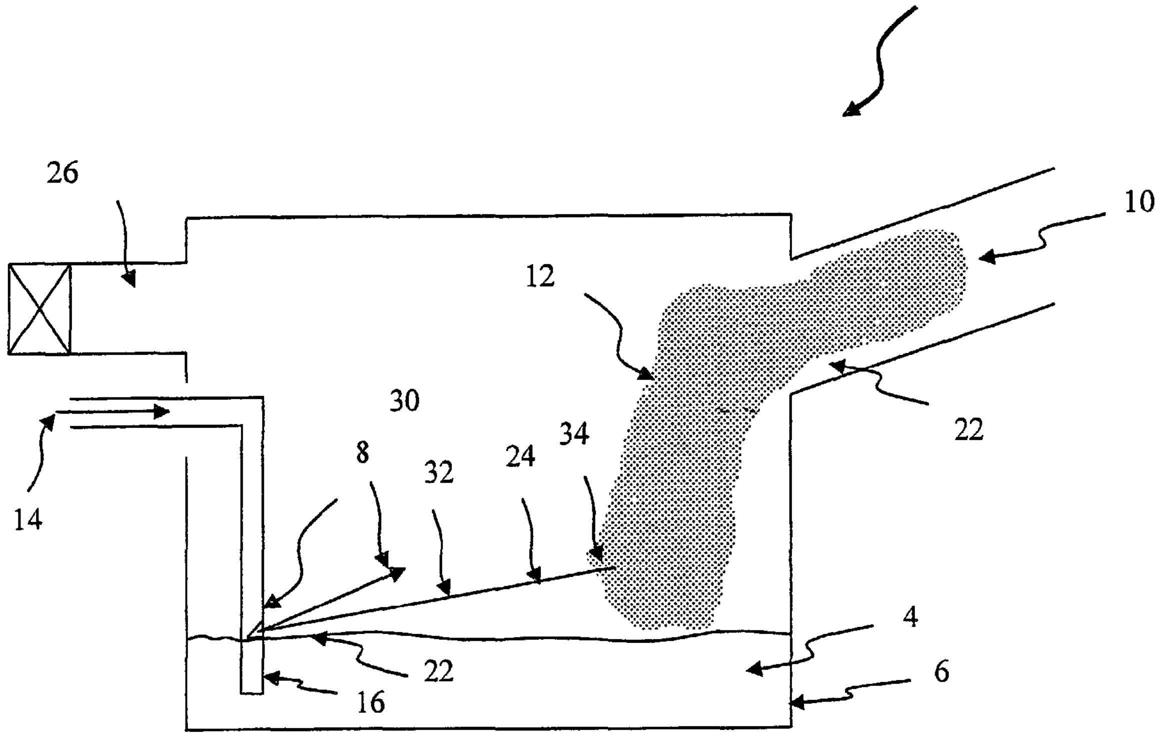
FIG. 1 shows a sectional view of an apparatus according to the invention.

FIG. 1 shows an apparatus 2 comprising a tank 6 which contains a liquid 4 where an orifice 8 generates droplets 12 for forming a fog 10. A high pressure air stream 14 is connected to a tube 16 which tube 16 contains the orifice 8. The orifice 8 is placed over but near the liquid surface 22 of the liquid 4. A liquid sheet 24 is created over the liquid surface 22. The generated droplets 12 are removed from the apparatus 2 by a low pressure air stream 26 which press the droplets 12 through an outlet 28 for forming the fog 10.

In operation of FIG. 1, the high pressure air stream 14 through the orifice 8 generates a jet 30 which jet is formed partly parallel to the liquid surface 22. The jet 30 generates a reduced pressure 32 over the liquid surface 22 which generates the liquid sheet 24. The liquid sheet 24 has a constant radial flow away from the orifice 8 and towards a breakdown zone 34 where the liquid sheet breaks up in droplets 12. The tube 16 is closed below the orifice 8 for forming an acoustic oscillation in the volume placed below the orifice 8. This oscillation cooperates with the liquid sheet 24 which starts oscillation with the same frequency as the oscillation generated in the tube 16. This oscillation further helps to produce a high amount of droplets 12. In a further improvement of the invention, the tube 16 could comprise a piston, which could be movable inside the tube 16. In this way, the oscillating frequency could be adjusted from the outside. Even by using an actuator for moving the piston up and down, an external commanding signal would be able to adjust the oscillating frequency in the tube 16.

Figure 2:
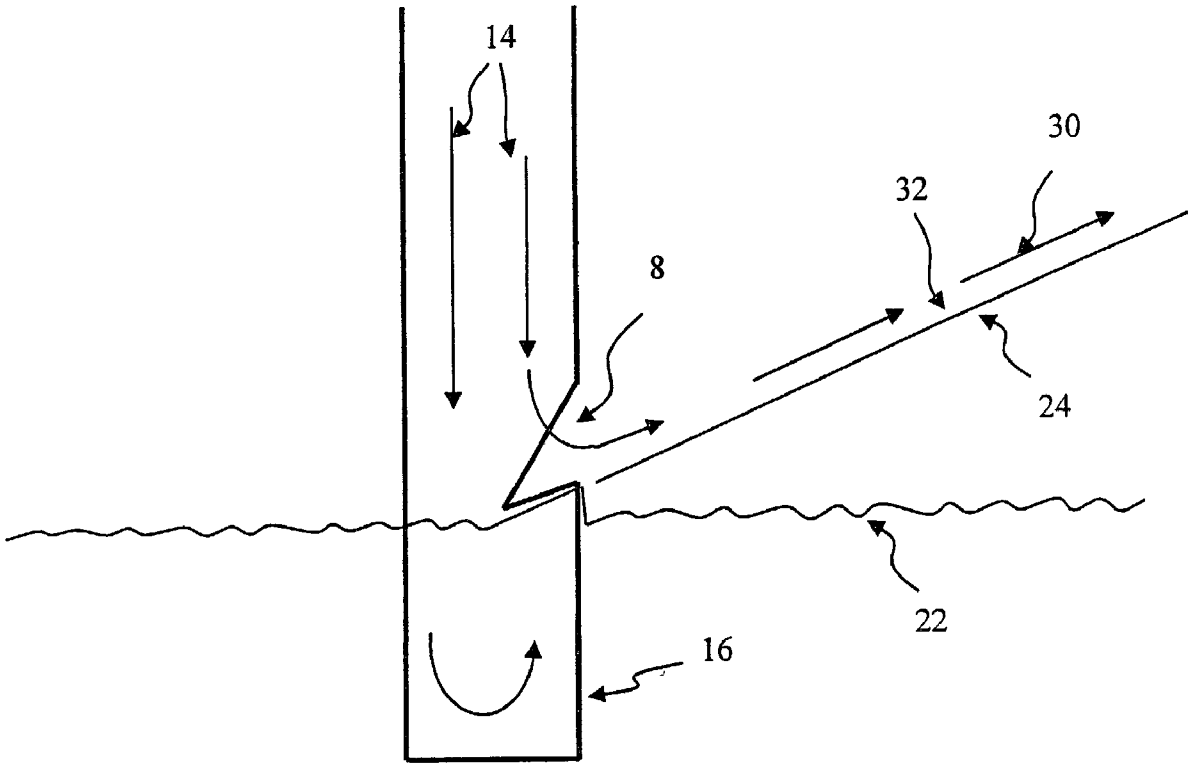
FIG. 2 shows an enlarged sectional view partly of the apparatus shown in FIG. 1.

FIG. 2 shows an enlarged sectional view of the tube 16 placed in the liquid 4. Furthermore, the orifice 8 is seen, and inside the tube 16, flow lines 14 indicate the high pressure air connection. Outside the orifice 8, the liquid sheet 24 is indicated above the liquid surface 22. The high pressure air 14 flows through the orifice 8 generating a jet 30, which jet because of the speed of the air generates a reduced pressure 32 above the liquid sheet 24. The reduced pressure lifts the liquid sheet up in a direction partly away from the liquid surface 22.

An air stream parallel to the jet 30 is probably also generated below the liquid film 24.

What is claimed is:

1. Method for forming fog, by using at least one air stream (14) connected to at least one tank (6), where the air stream (14) is forming homogeneous droplets of a fluid (4), which droplets are flowing further in the air stream (14) towards and through at least one outlet (28) for forming a fog, characterised in that a first high pressure air stream (14) is lead to flow in a mostly parallel direction to a liquid surface (22) generating a reduced pressure over the liquid surface (22) and forming at least one liquid sheet (24), which sheet brakes into droplets (12), where a second air stream (26) having a lower pressure is transporting the droplets (12) through at least one outlet (28).

2. Apparatus (2) for the generation of fog (10) including at least one tank (6) containing a liquid (4), in which tank (6) is contained at least one orifice (8) for the generation of droplets (12), which orifice (8) in operation is connected to means for generating a first air stream, characterised in that the apparatus (2) includes at least one tube (16), which tube (16) is connected to a source of compressed air (14) having a first pressure (20), which tube (16) is placed in the tank (6), and which tube (16) further includes an orifice (8) placed close to the surface (22) of the liquid (4) for forming at least one liquid sheet (24) for the generation of droplets (12), which apparatus (2) is connected to a second air stream (26) for the transportation of droplets (12) through at least one outlet (28).

3. Apparatus (2) according to claim 2, wherein the orifice (8) forms a jet (30), which jet (30) generates a partially reduced air pressure (32) over the liquid surface (22) for forming the liquid sheet (24) with a radial flow pattern over the liquid sheet (24).

4. Apparatus (2) according to claim 2, wherein the orifice (8) is forming a jet (30) over the liquid surface (22), where the height of the jet (30) over the liquid surface (22) determines the thickness of the liquid sheet (24).

5. Apparatus (2) according to claim 2, the air velocity of the jet (30) determines the thickness of the sheet (24).

6. Apparatus (2) according to claim 2, wherein the jet diameter has influences of the drop formation.

7. Apparatus (2) according to claim 2, wherein tube (16) is closed at a defined distance from the orifice (8) for forming an acoustic oscillation in the compressed air contained in the tube (16) for droplet formation of the liquid sheet (24).

8. Apparatus (2) according to claim 2, wherein the apparatus (2) includes at least one separator for removing droplets (12) with a diameter above 10 μm.

9. Apparatus (2) according to claim 2, wherein the apparatus (2) comprises more tanks (6) partly filled with a liquid (4), where each tank (6) comprises at least one orifice (8) for forming a liquid sheet (24).

10. Apparatus according to claim 2, wherein the level (22) of liquid (4) in at least one tank (6) is controlled by means for a constant supply of liquid, which means comprises a drain between at least one tank (6) towards an overflow and recovery channel from where the liquid is drained towards a pump and a concentration control system from where the liquid is supplied to the tanks (6).

11. Apparatus according to claim 2, wherein the apparatus comprises at least two tanks (6) arranged on either side of a central air duct connected to a central fan where the outlet (28) from the tanks (6) are connected to the central air duct.

12. Apparatus according to claim 2, wherein a central air duct is connected to a servo-controlled airflow director for adjusting the angle of the air stream in the vertical plane.

* * * * *